(12) United States Patent
Kerth

(10) Patent No.: US 7,783,274 B2
(45) Date of Patent: Aug. 24, 2010

(54) CHOPPED INTERMEDIATE FREQUENCY WIRELESS RECEIVER

(75) Inventor: Donald A. Kerth, Austin, TX (US)

(73) Assignee: ST-Ericsson SA, Geneva (CH)

( * ) Notice: Subject to any disclaimer, the term of this patent is extended or adjusted under 35 U.S.C. 154(b) by 621 days.

(21) Appl. No.: 11/733,735

(22) Filed: Apr. 10, 2007

(65) Prior Publication Data

US 2007/0178870 A1 Aug. 2, 2007

Related U.S. Application Data

(62) Division of application No. 10/748,425, filed on Dec. 30, 2003, now Pat. No. 7,206,560.

(51) Int. Cl.
*H04B 1/26* (2006.01)

(52) U.S. Cl. .............. 455/323; 455/192.2; 455/258; 455/326

(58) Field of Classification Search ........... 455/323, 455/192.2, 258, 326, 192.1, 255–259, 324, 455/313–318, 334; 375/344
See application file for complete search history.

(56) References Cited

U.S. PATENT DOCUMENTS 5,521,938 A * 5/1996 Stewart et al. ............. 375/146
5,812,523 A 9/1998 Isaksson et al.
5,828,705 A 10/1998 Kroeger et al.
5,872,480 A 2/1999 Huang
6,483,883 B1 11/2002 Iemura
6,490,326 B1 * 12/2002 Bastani et al. ............. 375/317
6,714,608 B1 3/2004 Samueli et al.
6,728,326 B1 4/2004 Fulghum
6,829,311 B1 * 12/2004 Riley ..................... 375/326
2004/0125240 A1 7/2004 Stikvoort et al.
2005/0143040 A1 6/2005 Kerth et al.
2006/0088136 A1 4/2006 Morie et al.

* cited by examiner

*Primary Examiner*—Pablo N Tran
(74) *Attorney, Agent, or Firm*—William J. Kubida; Scott J. Hawranek; Hogan Lovells US LLP

(57) ABSTRACT

A chopped intermediate frequency (IF) wireless receiver is disclosed. The wireless receiver includes a local oscillator (LO), a first and a second mixers, an LO frequency control module, an IF filter, a digital down converter and a down conversion controller. The LO provides a local oscillating signal to the first and second mixers. The first and second mixers converts a received radio frequency signal to an in-phase IF signal and a quadrature IF signal, respectively. The LO frequency control module alternately down converts a channel frequency by changing an oscillation frequency of the LO. Coupled to the digital down converter, the down conversion controller adjusts a complex sine wave within the digital down converter while the in-phase IF signal and the quadrature IF signal are being down-converted by the digital down converter to a baseband signal.

18 Claims, 4 Drawing Sheets

CHOPPED INTERMEDIATE FREQUENCY WIRELESS RECEIVER

CROSS REFERENCE TO RELATED APPLICATIONS

This is a divisional of application Ser. No. 10/748,425, filed on Dec. 30, 2003, now U.S. Pat. No. 7,206,560

BACKGROUND OF THE INVENTION

1. Technical Field

The present invention relates to wireless communication in general, and in particular to wireless transceivers. Still more particularly, the present invention relates to a chopped intermediate frequency wireless receiver.

2. Description of Related Art

Unlike wireline communication environments, a wireless communication environment has to accommodate a large number of users sharing different parts of the frequency spectrum with very strong signals coexist adjacent to very weak signals. Hence, a wireless receiver should be able to select the signal of interest while rejecting all other signals. According to their respective architecture, wireless receivers can generally be classified under two categories, namely, homodyne receivers and heterodyne receivers.

With a homodyne receiver, the desired signal is initially selected by a bandselect filter and is subsequently amplified by a low-noise amplifier. The desired signal is then frequency translated by a mixer to DC before other baseband operations are performed on the desired signal. With a heterodyne receiver, the desired signal is sent through receiver components similar to those in the homodyne receiver with the exception that the desired signal is translated to an intermediate frequency (IF) when signal processing operations are performed.

For heterodyne wireless receivers, image rejection refers to the ability to select the desired signal from the image of the desired signal spaced away by twice the IF signal. Basically, a heterodyne wireless receiver should be able to select the desired signal from its image. Otherwise, the subsequent detector circuit within the heterodyne wireless receiver will not be able to distinguish between the desired signal and the image signal, and the output becomes the superposition of both signals. Accordingly, image rejection is one of the problems that are faced by designers of heterodyne wireless receivers.

Also, in many wireless receiver designs, all internally used oscillator frequencies are derived from a single high-accuracy reference oscillator, which can produce interference at fundamental, harmonic and sub-harmonic frequencies of the reference oscillator. The mixing of such interference frequencies with unwanted input signals is referred to as a spurious signal. Spurious signals are commonly found in wireless receivers. A wireless receiver may down convert a spurious signal that can interfere with the desired signal of interest, and as a result, the desired signal of interest can be corrupted.

The present disclosure provides a method and apparatus for alleviating the above-mentioned problems within a wireless receiver.

SUMMARY OF THE INVENTION

In accordance with a preferred embodiment of the present invention, a wireless receiver includes a local oscillator (LO), a first and second mixers, an LO frequency control module, an intermediate frequency (IF) filter, a digital down converter and a down conversion controller. The LO provides a local oscillating signal to the first and second mixers. The first and second mixers converts a received radio frequency signal to an in-phase IF signal and a quadrature IF signal, respectively. The LO frequency control module alternately down converts a channel frequency by changing an oscillation frequency of the LO. Coupled to the digital down converter, the down conversion controller adjusts a complex sine wave within the digital down converter while the in-phase IF signal and the quadrature IF signal are being down-converted by the digital down converter to a baseband signal.

Alternatively, a wireless receiver includes an LO, a first and a second mixers, an LO frequency control module, an IF filter, a switch and a digital down converter. The LO provides a local oscillating signal to the first and second mixers. The first and second mixers converts a received radio frequency signal to an in-phase IF signal and a quadrature IF signal, respectively. The LO frequency control module alternately down converts a channel frequency by changing an oscillation frequency of the LO. Coupled to the IF filter, the switch alternately swaps signals paths of the in-phase IF signal and the quadrature IF signal on a frame-by-frame basis in synchronization with the LO frequency control module. The digital down converter subsequently down-converts the in-phase IF signal and the quadrature IF signal to a baseband signal.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
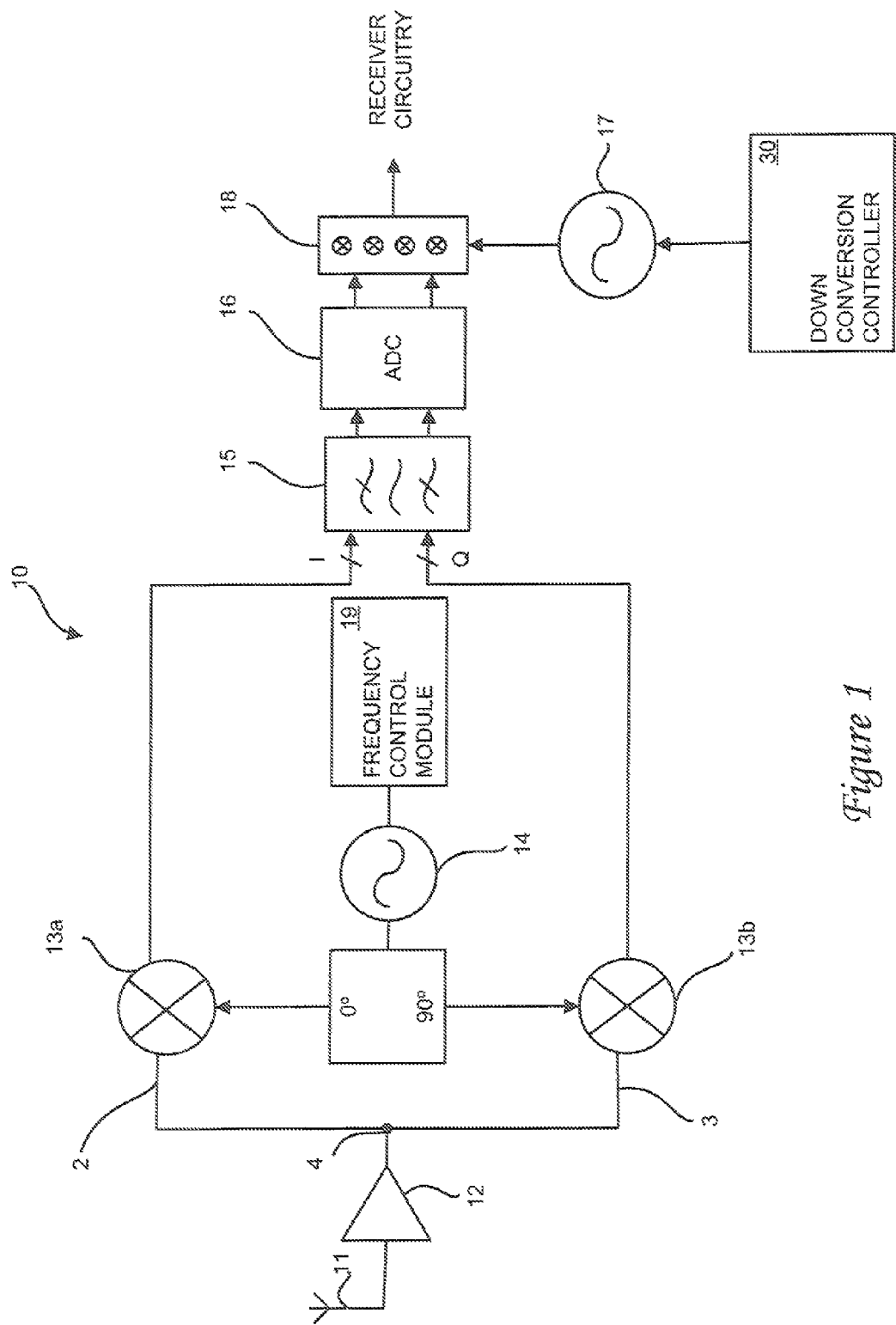
FIG. 1 is a block diagram of a chopped intermediate frequency wireless receiver, in accordance with a preferred embodiment of the present invention.

Referring now to the drawings and in particular to FIG. 1, there is depicted a block diagram of a chopped intermediate frequency (IF) radio frequency (RF) receiver, in accordance with a preferred embodiment of the present invention. As shown, a RF receiver 10 includes an antenna 11, a low-noise amplifier 12, a pair of RF mixers 13a-13b, an IF filter 15, and analog-to-digital converter (ADC) 16 and a digital down converter 18 along with additional receiver circuitry (not shown) that are well-known to those skilled in the art. In addition, RF receiver 10 includes a radio frequency local oscillator (RFLO) 14 coupled to RF mixers 13a-13b for generating an in-phase signal and a quadrature signal. RF receiver 10 also includes an LO frequency control module 19 coupled to RFLO 14 for controlling the oscillation frequency of RFLO 14. Similarly, a down conversion controller 30 is coupled to a digital complex sinusoid signal IFLO 17 for controlling the oscillation frequency of IFLO 17 that is connected to digital down converter.

RF signals are initially received by antenna 11. After passing through low-noise amplifier 12, the RF signals enter an in-phase path 2 and a quadrature path 3 via a junction 4. A first input of RF mixer 13a is connected to in-phase path 2, and a second input of RF mixer 13a is connected to an in-phase output of RFLO 14. The output of RF mixer 13a provides in-phase IF signals to IF filter 15 via an in-phase signal path I. Similarly, a first input of RF mixer 13b is connected to quadrature path 3, and a second input of RF mixer 13b is connected to a 90° out-of-phase output of RFLO 14. The output of RF mixer 13b provides quadrature IF signals to IF filter 15 via a quadrature signal path Q. Both IF signal paths for RF receiver 10 may be approximately 200 kHz.

In the embodiment as shown in FIG. 1, the IF signals within in-phase signal path I and quadrature signal path Q of RF receiver 10 are completely independent from each other until the final down conversion to a baseband signal. In other words, each of the IF signal paths I and Q does not have a complex transfer function. Because the transfer functions for the IF signal paths I and Q are real, the desired signal can be down converted to a +200 kHz IF signal or a −200 kHz IF signal by changing the oscillation frequency of RFLO 14.

Under time-division multiple access (TDMA), data are typically interleaved several times and are collected in TDMA frames. Thus, the above-mentioned IF signals down conversion can be performed on a frame-by-frame basis by simply utilizing LO frequency control module 19 to control the oscillation frequency of RFLO 14. Preferably, the oscillation frequency of RFLO 14 is modified as follows:

even frame: $f_{RFLO} = f_{CH} - f_{IF}$ odd frame: $f_{RFLO} = f_{CH} + f_{IF}$ Alternatively, the oscillation frequency of RFLO 14 can be modified as follows:

even frame: $f_{RFLO} = f_{CH} + f_{IF}$ odd frame: $f_{RFLO} = f_{CH} - f_{IF}$ where
 $f_{RFLO}$=oscillation frequency of RFLO 14
 $f_{CH}$=frequency of channel
 $f_{IF}$=frequency of IF signals Basically, the IF signal down conversions are performed as a complex sinusoidal multiplication of the RF signals as follows:

$$IF(t) = RF(t) \times e^{-2\pi j f_{RFLO}}$$

where $f_{RFLO} = f_{CH} \pm f_{IF}$

No adjustment or modification to the IF signal paths I and Q within RF receiver 10 is required.

The final down conversion of the IF signals to a baseband signal can be performed by one of the following two methods. The first method is by adjusting the digital complex sine wave used in the final down conversation within a digital down converter such as digital down converter 18. Specifically, the digital complex sine wave used in digital down converter 18 is adjusted by adjusting the frequency of IFLO 17 via down conversion controller 30. Preferably, the adjustment is performed as follows:

even frame: $IFLO(t) = e^{-j\omega_{IF} t}$ odd frame: $IFLO(t) = e^{+j\omega_{IF} t}$ Alternatively, even frame: $IFLO(t) = e^{+j\omega_{IF} t}$ odd frame: $IFLO(t) = e^{-j\omega_{IF} t}$ where $e^{-j\omega_{IF} t} = \cos \omega_{IF} t - j \sin \omega_{IF} t$ $e^{+j\omega_{IF} t} = \cos \omega_{IF} t + j \sin \omega_{IF} t$ $\omega_{IF} = 2\pi f_{IF}$ No adjustment or modification to the IF signal paths I and Q within RF receiver 10 is required.

The second method for performing down-conversion of IF signals is to use a switch to swap the two IF signal paths (from +200 kHz to −200 kHz) before the down-conversion stage. The second method is further illustrated in FIG. 2.

Figure 2:
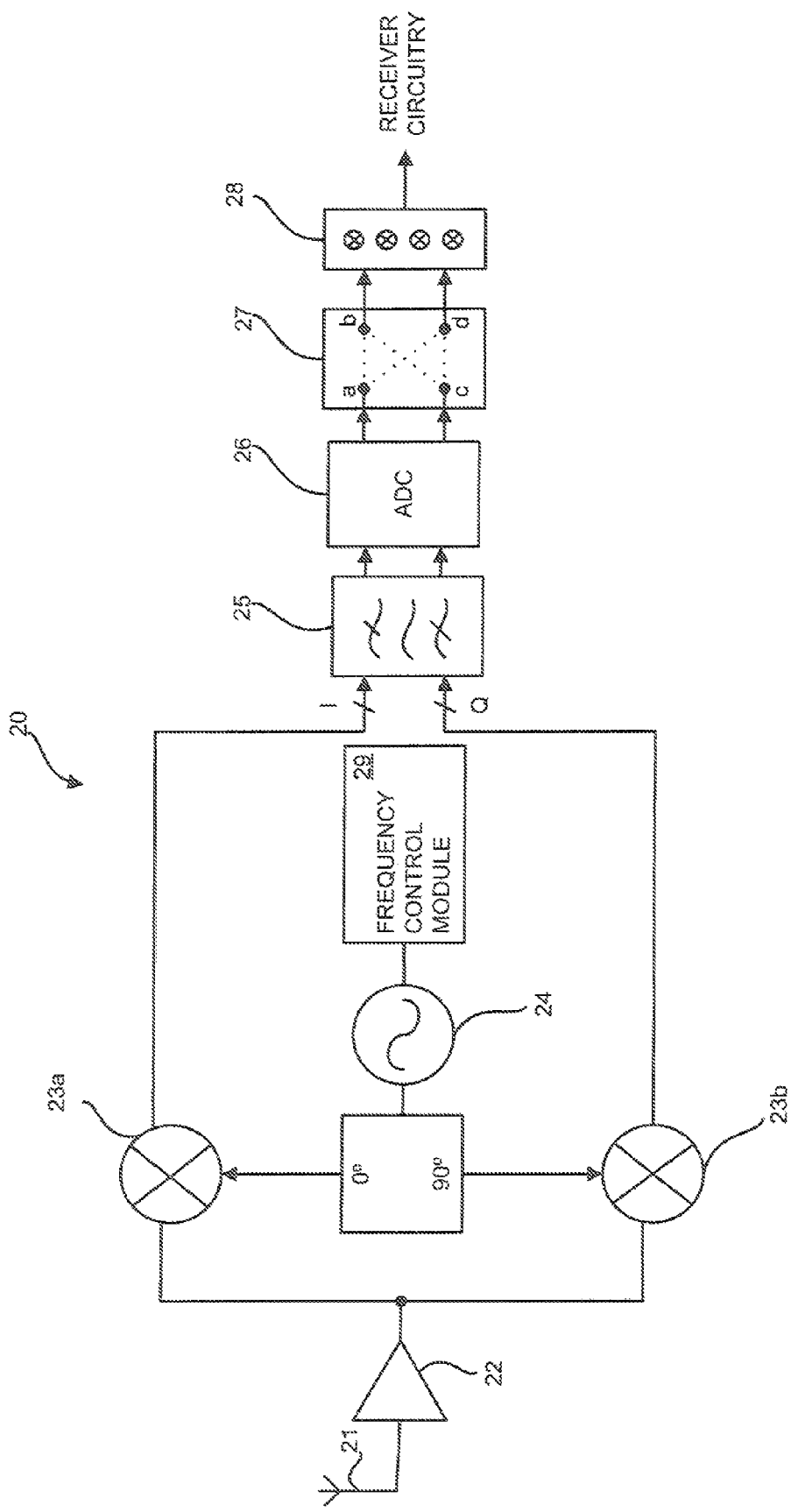
FIG. 2 is a block diagram of a chopped intermediate frequency wireless receiver, in accordance with an alternative embodiment of the present invention.

With reference now to FIG. 2, there is depicted a block diagram of a chopped IF RF receiver, in accordance with an alternative embodiment of the present invention. As shown, a RF receiver 20 includes an antenna 21, a low-noise amplifier 22, a pair of RF mixers 23a-23b, an IF filter 25, an ADC 26, a switch 27 and a digital down converter 28 along with additional receiver circuitry (not shown) that are well-known to those skilled in the art. In addition, RF receiver 20 includes a RFLO 24 coupled to RF mixers 23a-23b. RF receiver 20 also includes an LO frequency control module 29 coupled to RFLO 24 for controlling the oscillation frequency of RFLO 24.

In essence, the basic functional components of RF receiver 20 are similar to those of RF receiver 10 from FIG. 1. The main difference between RF receiver 20 and RF receiver 10 from FIG. 1 is that instead of using a IFLO and a down conversion controller to adjust the digital complex sine wave used in a digital down converter, a switch, such as switch 27, is used to swap every other frame between the IF signal paths I and Q. For example, in switch 27 of FIG. 2, even frame: node a connects to node b; node c connects to node d odd frame: node a connects to node d; node c connects to node b Alternatively, even frame: node a connects to node d; node c connects to node b odd frame: node a connects to node b; node c connects to node d In both of the above-mentioned cases, nodes a and b are connected to the IF signal path I, and nodes c and d are connected to the IF signal path Q. Although switch 27 is shown to be located between ADC 26 and digital down converter 28 in FIG. 2, switch 27 can be located anywhere within the IF signal paths. For example, switch 27 can be located between IF filter 25 and ADC 26 or between RF mixers 23a-23b and IF filter 25.

Figure 3A:
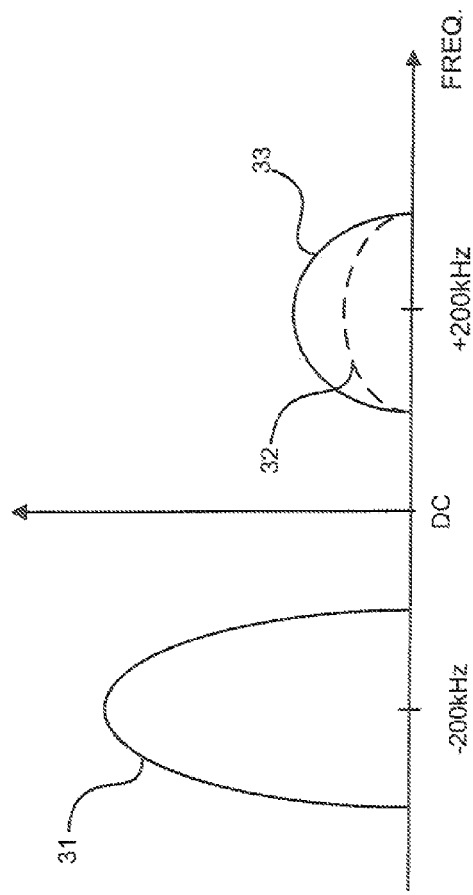
FIGS. 3a-3b graphically illustrate the potential improvements in the interference performance of a chopped intermediate frequency wireless receiver with respective to image rejection.
Figure 3B:
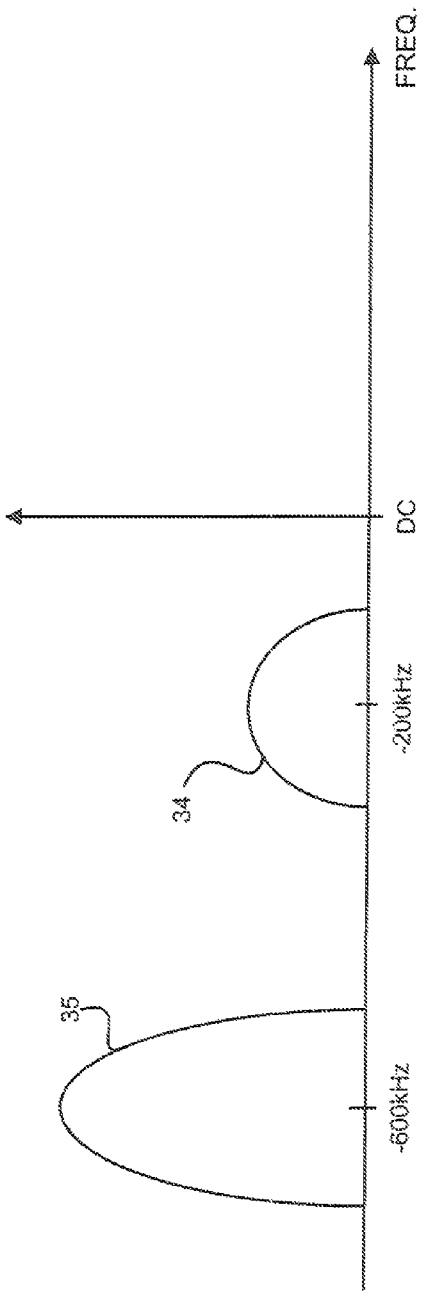

Referring now to FIGS. 3a-3b, there are graphically illustrated the potential improvement in the interference performance with respective to image rejection within a chopped IF wireless receiver, such as RF receiver 10 in FIG. 1 and RF receiver 20 in FIG. 2, by swapping IF signal frequencies. FIG. 3a represents even numbered frames (i.e., +200 kHz IF signals), and FIG. 3b represents odd numbered frames (i.e., −200 kHz IF signals). As shown in FIG. 3a, because of the limited image rejection, a −400 kHz reference interferer 31 images into the +200 kHz side as an interference signal 32 on the even frames. As a result, interference signal 32 interferes with a desired signal 33. In FIG. 3b, the −400 kHz reference interferer 35 does not image into a desired signal 34 on the odd frames. Because of the present invention, the odd frames will not "see" the mirrored interference for a −400 kHz reference interferer. Hence, the overall carrier/interference (C/I) ratio is improved by approximately 3 dB since only half of the frames are affected by the mirrored reference interference.

Figure 4A:
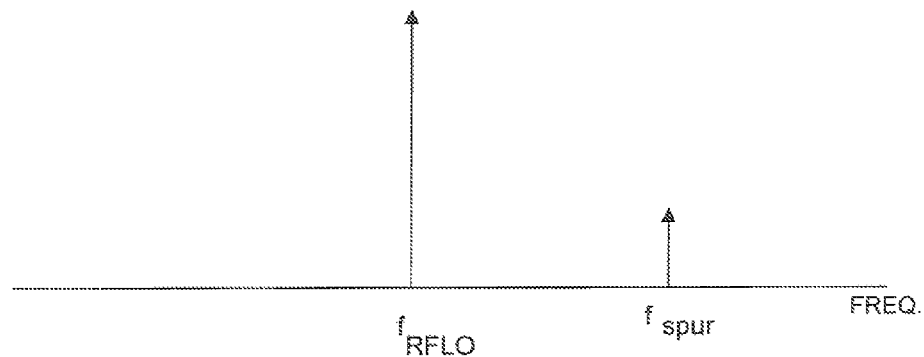
FIGS. 4a-4d graphically illustrate the potential improvements in the blocking performance of a chopped intermediate frequency wireless receiver with respective to spurious signals.
Figure 4B:
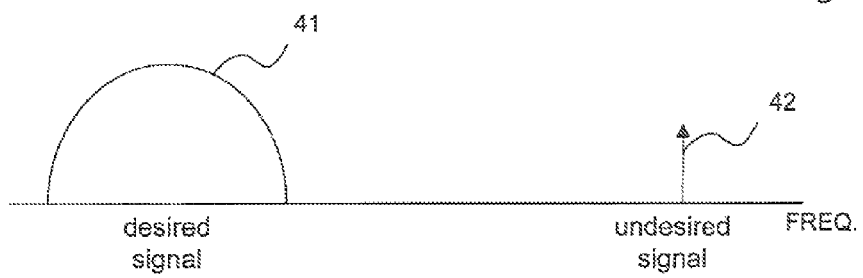
Figure 4C:
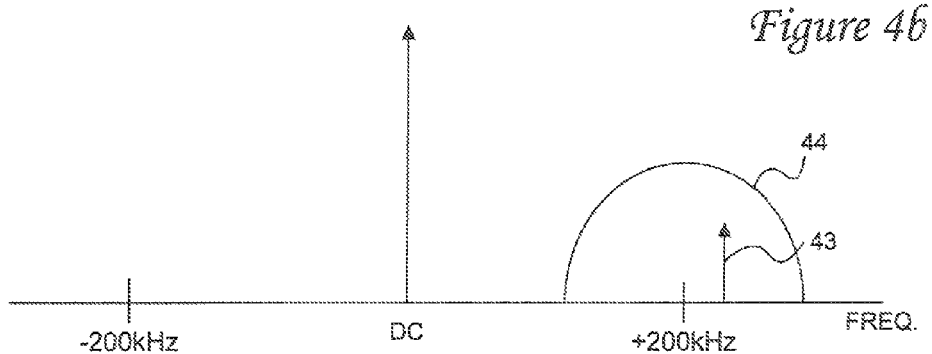
Figure 4D:
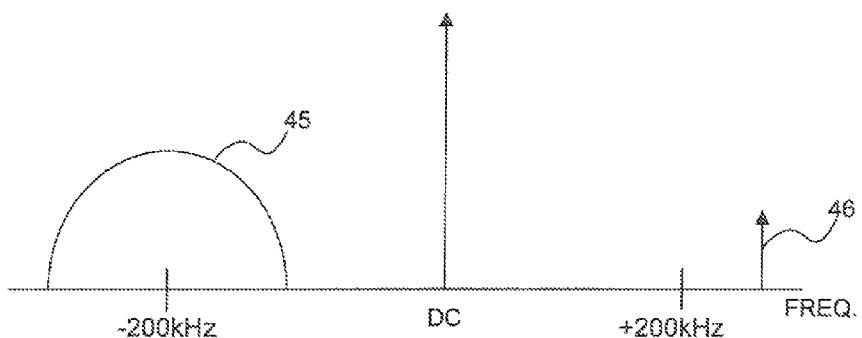

With reference now to FIGS. 4a-4b, there is graphically illustrated the potential improvement in the blocking performance with respective to spurious response within a chopped IF wireless receiver, such as RF receiver 10 in FIG. 1 and RF receiver 20 in FIG. 2, by swapping IF signal frequencies. As shown, FIG. 4a represents a RFLO signal $f_{RFLO}$ and a spurious response $f_{spur}$, and FIG. 4b represents a desired signal 41 and an undesired signal 42. FIG. 4c represents even numbered frames (i.e., +200 kHz IF signals), and FIG. 4d represents odd numbered frames (i.e., −200 kHz IF signals). During the operation of a wireless receiver, RFLO signal $f_{RFLO}$ mixes with desired signal 41 to produce desired signals 44 and 45 in FIGS. 4c and 4d, respectively. Similarly, spurious response $f_{spur}$ mixes with undesired signal 42 to produce spurious signals 43 and 46 in FIGS. 4c and 4d, respectively.

Typically, the spurious response of a wireless receiver does not change when the frequency of a RFLO is adjusted. Therefore, as the frequency of the RFLO is adjusted on a frame-by-frame basis (i.e., swapping the IF signal from +200 kHz to −200 kHz), the spurious signal down-converted to IF will be either a +200 kHz interference signal or a −200 kHz interference signal. Either way, as the signal is swapped between +200 kHz and −200 kHz, alternate frames will not "see" the wanted signal degraded by the spurious signal. Hence, spurious signal 42 mixes into the +200 kHz side on even frames and interferes with desired signal 44; but spurious signal 42 does not mix into the desired signal 45 on the odd frames. As a result, the overall signal quality of the wireless receiver is improved because of the present invention.

As has been described, the present invention provides a chopped IF wireless receiver. The present invention improves the quality of a signal within a wireless receiver by swapping the IF signal frequency on a frame-by-frame basis. One main advantage of the present invention is that no adjustment to the IF signal paths I and Q is required for the swapping of the IF signal frequency.

The method and apparatus of the present invention are applicable to RF receivers suitable to be used in TDMA communication networks, such as Global System for Mobile communications (GSM) networks. Although a RF receiver is used to illustrate the present invention, it is understood by those skilled in the art that the present invention is also applicable to the receiver portion of wireless transceivers.

While the invention has been particularly shown and described with reference to a preferred embodiment, it will be understood by those skilled in the art that various changes in form and detail may be made without departing from the spirit and scope of the invention.

What is claimed is:

1. A radio frequency (RF) receiver comprising:
   a local oscillator (LO) for generating a local oscillation signal;
   first and second mixers coupled to said LO, for converting a received RF signal to an in-phase intermediate frequency (IF) signal and a quadrature IF signal, respectively;
   an LO frequency control module, coupled to said LO, for alternately down-converting a channel frequency by changing an oscillation frequency of said LO;
   a switch, coupled to said first and second mixers, for alternately swapping signals paths of said in-phase IF signal and said quadrature IF signal in synchronization with an oscillation frequency of said LO; and
   a down converter, coupled to said switch, for down converting said in-phase IF signal and said quadrature IF signal to a base band signal.

2. The RF receiver of claim 1, wherein said LO frequency control module alternately down-converts a channel frequency on a frame-by-frame basis.

3. The RF receiver of claim 2, wherein said LO frequency control module alternately down-converts a channel frequency by even frame: $f_{RFLO} = f_{CH} - f_{IF}$ odd frame: $f_{RFLO} = f_{CH} + f_{IF}$ wherein
   $f_{RFLO}$ = said local oscillation frequency
   $f_{CH}$ = said channel frequency
   $f_{IF}$ = said IF signal frequency.

4. The RF receiver of claim 3, wherein said frames are time-division multiple access (TDMA) frames.

5. The RF receiver of claim 2, wherein said LO frequency control module alternately down-converts a channel frequency by even frame: $f_{RFLO} = f_{CH} + f_{IF}$ odd frame: $f_{RFLO} = f_{CH} - f_{IF}$ wherein
   $f_{RFLO}$ = said local oscillation frequency
   $f_{CH}$ = said channel frequency
   $f_{IF}$ = said IF signal frequency.

6. The RF receiver of claim 5, wherein said frames are time-division multiple access (TDMA) frames.

7. The RF receiver of claim 1, wherein said RF receiver further includes an IF filter.

8. The RF receiver of claim 1, wherein said RF receiver further includes an analog-to-digital converter.

9. A method for enhancing signal quality within a radio frequency (RF) receiver, said method comprising:
   receiving an RF signal;
   alternately down-converting a channel frequency by changing a local oscillation frequency, wherein said local oscillation frequency is utilized for converting said received RF signal to an in-phase intermediate frequency (IF) signal and a quadrature IF signal;
   alternately swapping signals paths of said in-phase IF signal and said quadrature IF signal in synchronization with said local oscillation frequency; and
   down converting said in-phase IF signal and said quadrature IF signal to a baseband.

10. The method of claim 9, wherein said alternately down-converting further includes alternately down-converting said in-phase IF signal and said quadrature IF signal on a frame-by-frame basis.

11. The method of claim 10, wherein said alternately down-converting is performed by even frame: $f_{RFLO} = f_{CH} - f_{IF}$ odd frame: $f_{RFLO} = f_{CH} + f_{IF}$ wherein
   $f_{RFLO}$ = said local oscillation frequency $f_{CH}$=said channel frequency
$f_{IF}$=said IF signal frequency.

12. The method of claim 11, wherein said frames are time-division multiple access (TDMA) frames.

13. The method of claim 11, wherein said alternately down-converting is performed by even frame: $f_{RFLO}=f_{CH}+f_{IF}$ odd frame: $f_{RFLO}=f_{CH}-f_{IF}$ wherein
$f_{RFLO}$=said local oscillation frequency
$f_{CH}$=said channel frequency
$f_{IF}$=said IF signal frequency.

14. The method of claim 13, wherein said frames are time-division multiple access (TDMA) frames.

15. A method for enhancing signal quality within a radio frequency (RF) receiver, said method comprising:
  receiving an RF signal;
  alternately down-converting a channel frequency by changing a local oscillation frequency, wherein said local oscillation frequency is utilized for converting said received RF signal to an in-phase intermediate frequency (IF) signal and a quadrature IF signal;
  alternately swapping signal paths of said in-phase IF signal and said quadrature IF signal in synchronization with said local oscillation frequency; and
  down converting said in-phase IF signal and said quadrature IF signal to a baseband, wherein said alternately down-converting further includes alternately down-converting said in-phase IF signal and said quadrature IF signal on a frame-by-frame basis.

16. The method of claim 15, wherein said alternately down-converting is performed by even frame: $f_{RFLO}=f_{CH}-f_{IF}$ odd frame: $f_{RFLO}=f_{CH}+f_{IF}$ wherein
$f_{RFLO}$=said local oscillation frequency
$f_{CH}$=said channel frequency
$f_{IF}$=said IF signal frequency.

17. The method of claim 16, wherein said frames are time-division multiple access (TDMA) frames.

18. The method of claim 17, wherein said alternately down-converting is performed by even frame: $f_{RFLO}=f_{CH}+f_{IF}$ odd frame: $f_{RFLO}=f_{CH}-f_{IF}$ wherein
$f_{RFLO}$=said local oscillation frequency
$f_{CH}$=said channel frequency
$f_{IF}$=said IF signal frequency.

* * * * *